United States Patent
Peterson, Jr. et al.

(10) Patent No.: US 6,364,971 B1
(45) Date of Patent: Apr. 2, 2002

(54) APPARATUS AND METHOD OF REPAIRING TURBINE BLADES

(75) Inventors: Artie Gene Peterson, Jr., Locust; David Wayne Gandy, New London; Gregory Frederick, Harrisburg, all of NC (US); Jan T. Stover, Travelers Rest, SC (US); Ramaswamy Viswanathan, Saratoga, CA (US)

(73) Assignee: Electric Power Research Institute, Palo Alto, CA (US)

( * ) Notice: Subject to any disclaimer, the term of this patent is extended or adjusted under 35 U.S.C. 154(b) by 0 days.

(21) Appl. No.: 09/487,931

(22) Filed: Jan. 20, 2000

(51) Int. Cl.$^7$ ............................................... B23K 26/34
(52) U.S. Cl. .................... 148/525; 219/121.64; 228/228
(58) Field of Search ................................ 148/524, 525, 148/527; 219/121.64; 228/228, 235.1

(56) References Cited

U.S. PATENT DOCUMENTS

| | | | | |
|---|---|---|---|---|
| 4,804,815 A | | 2/1989 | Everett .................... | 219/121.6 |
| 4,817,858 A | * | 4/1989 | Verpoort .................... | 228/193 |
| 5,106,010 A | | 4/1992 | Stueber et al. .............. | 228/232 |
| 5,374,319 A | | 12/1994 | Stueber et al. .............. | 148/404 |
| 5,383,985 A | * | 1/1995 | Coulon ....................... | 148/527 |
| 5,723,078 A | | 3/1998 | Nagaraj et al. ............... | 264/36 |
| 5,735,044 A | | 4/1998 | Ferrigno et al. ............. | 29/889.1 |
| 5,783,318 A | | 7/1998 | Bionde et al. ............ | 428/680 |
| 5,806,751 A | | 9/1998 | Schaefer et al. ........... | 228/119 |
| 5,822,852 A | | 10/1998 | Bewlay et al. ............. | 29/889.1 |
| 5,846,057 A | | 12/1998 | Ferrigno et al. ............ | 416/241 |
| 5,897,801 A | * | 4/1999 | Smashey et al. ............ | 148/524 |
| 5,951,792 A | * | 9/1999 | Balbach et al. ............. | 148/527 |

OTHER PUBLICATIONS

Gandy, D. W., Frederick, G., Viswanathan, R., and Stover, J. D., "Recent EPRI Research & Development Activities in the Weld Repair of Nickel–based Gas Turbine Blade Superalloys,"*EPRI Welding & Repair Technology for Power Plants, 3rd International Conference Proceedings,* Jun. 9–12, 1998.

Gandy, D. W., Viswanathan, R., and Stover, J. D., "Status of Weld Repair Technology for Nickel–Based Superalloy Gas Turbine Blading,"*EPRI Final Report,* Apr. 1998.

Hanes, H. D., Seifert, D. A., and Watts, C. R., "Hot Isostatic Processing," *Metals and Ceramics Information Center, Batelle's Columbus Laboratoires,* pp. 1–2, 31–32, 46–48, and 58, 1979.

Rinaldi, C. et al., "Automatic Refurbishment of Gas Turbine Components by $CO_2$ Robo–Laser," *Proceedings from Materials Solutions '97 on Joining and Repair of Gas Turbine Components,* pp. 109–117, Sep. 15–18, 1997.

Simkovich, G. and Whitney, E., "Improved Nickel Based Superalloy With Excellent Oxidation Resistance and Weldability," *The Pennsylvanis State University,* Jul. 17, 1997.

Viswanthan, R. and Scheibel, J., "Assessment of the Laser Welding Process for Superalloy Gas Turbine Blade Welding," *EPRI Repair and Replacement Applications Center, Final Report,* Oct. 1999.

Williams, A. D., "A Case Study of Laser Powder Feed Welding Under Engine Operating Conditions," *EPRI Welding & Repair Technology for Power Plants, 3rd International Conference Proceedings,* Jun. 9–12, 1998.

* cited by examiner

*Primary Examiner*—George Wyszomierski
(74) *Attorney, Agent, or Firm*—Pennie & Edmonds LLP

(57) ABSTRACT

A method of repairing a metallic member, such as a superalloy turbine blade, includes the step of preparing the blade by stripping the protective coatings from the blade. The blade is then pre-conditioned for welding by a first hot isostatic process. Once the blade conditioning sequence is complete, the blade is welded using a laser welding technique and by adding weld fillers to the weld area. After the welding step, the blade is sealed by a second hot isostatic process treatment performed at conditions similar to the first hot isostatic process. The blade is finally prepared for re-entry into service.

18 Claims, 4 Drawing Sheets

APPARATUS AND METHOD OF REPAIRING TURBINE BLADES

BRIEF DESCRIPTION OF THE INVENTION

The present invention relates to a method of repairing metallic parts, and in particular to a method of repairing superalloy turbine blades.

BACKGROUND OF THE INVENTION

Over the years, superalloy materials have been developed to provide mechanical strength to turbine blades and vanes operating at high temperatures. Most modem high temperature superalloy articles such as nickel-based, precipitation strengthened superalloys used in the manufacture of rotating gas turbine blades are complex alloys at the cutting edge of high temperature metallurgy. No other class of alloys can match their high temperature strength. As these turbine blades are difficult and expensive to manufacture, it is far more desirable to repair a damaged blade than to replace one. As a result, a variety of repair methods have been developed and reported, such as for example conventional fusion welding, plasma thermal metal spraying, brazing etc. These processes are most suitable for providing relatively thin coatings. Traditional weld repair has met with only limited success. The quantities of certain precipitate-forming elements (mainly aluminum and titanium) that are added specifically for high temperature strength are primarily responsible for the poor welding record. The weldability of blade superalloys is limited principally by their tendency to form cracks. Two distinct types of cracking have been identified: (1) hot cracking and (2) strain age cracking (SAC). Hot cracking occurs in the filler metal and heat, affected zone (HAZ) during welding and is typically in the form of tiny fissures, or microcracks, beneath the surface of the weldment. Strain age cracking occurs during post weld heat treatment, usually initiating in the HAZ and often propagating well into the adjacent base alloy. Strain age cracks are generally much longer than hot cracks, sometimes extending several inches into the base material.

Weld filler materials that have been most effective in the repair of precipitation strengthened blade superalloys are simpler, solid-solution strengthened alloys that have significantly lower strength. The use of low strength filler materials significantly limits the locations on the blade where weld repairs can be allowed. Current industry practice permits welding only in areas of very low stress, thus, some 80 to 90 percent of blade surfaces are non-repairable. Blades with non-repairable damage are generally returned to suppliers as scrap for credit against replacement blades. The financial impact on utilities is considerable. A single air-cooled, row 1 rotating blade may cost up to thirty-five thousand dollars to replace and, depending upon the turbine manufacturer and model, there are approximately 90 to 120 blades in a typical row.

Various studies have been conducted by the Assignee of the present invention and others to evaluate methods for the repair of precipitation strengthened blade alloys. These studies have included evaluations of both narrow and wide-gap brazing, gas tungsten arc welding, plasma transferred arc welding, and electron beam welding. Narrow-gap brazing techniques have been plagued by joint contamination that results in incomplete bonding, even when elaborate thermochemical cleaning processes precede the brazing operation. Narrow gap brazing also lacks the ability to restore damaged or missing areas on the blade. Joints formed using wide gap brazing methods can be difficult to set-up and porosity in the deposited filler material continues to be a concern.

Traditional Gas Tungsten Arc Welding (GTAW) and Plasma Tungsten Arc Welding (PTAW) are the methods most commonly used in blade repair today, however, they require the use of lower strength fillers in order to avoid cracking (as discussed above).

Many experts believe that low energy welding processes have the highest potential for advancing the state of the art for blade repair. The use of such processes have been shown to reduce cracking. Laser beam welding (LBW) and electron beam welding (EBW) are both low energy processes capable of providing small volume welds with narrow heat affected zones. EBW, however, has inherent limitations in weld path flexibility and must be performed in a vacuum chamber. EBW is currently being used for the repair of gas turbine stationary vanes, combustion components and shaft seals where the joint geometry is relatively straight or in one plane. Application of EBW in the repair of complex blade airfoil shapes would require significant development and is not considered practical at this time. In view of the foregoing, it would be highly desirable to provide an improved technique for repairing metallic parts, such as superalloy turbine blades.

SUMMARY OF THE INVENTION

According to the invention there is provided a method of repairing a metallic member, such as a superalloy turbine blade. The blade is prepared by stripping the protective coatings from the blade. The blade is then pre-conditioned for welding by a first hot isostatic process. Once the blade conditioning sequence is complete, the blade is welded using a laser welding technique and by adding weld fillers to the weld area. After the welding step, the blade is sealed by a second hot isostatic process treatment performed at conditions similar to the first hot isostatic process. The blade is finally prepared for re-entry into service.

This repair methodology provides a means to extend the current limits of repair to the more highly stressed areas of the blade. One of the advantages of the technique of the invention is that the use of precipitation strengthened filler alloys more closely matches the mechanical properties of the base alloy. Another advantage of the invention is that the use of Nd:YAG (Yttrium Aluminum Garnet—Doped with Nd) or Carbon Dioxide lasers as the welding heat source, as opposed to conventional arc welding processes, produces smaller heat affected zones and reduces the stress field due to the lower quantity of heat introduced in the weld zone. A further advantage of the invention is that the introduction of a dual hot isostatic process, which brackets the welding application, preconditions the substrate for welding and eliminates any microcracking inherent with the superalloy blades after welding.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding elements throughout the several drawings.

DETAILED DESCRIPTION OF THE INVENTION

Figure 1:
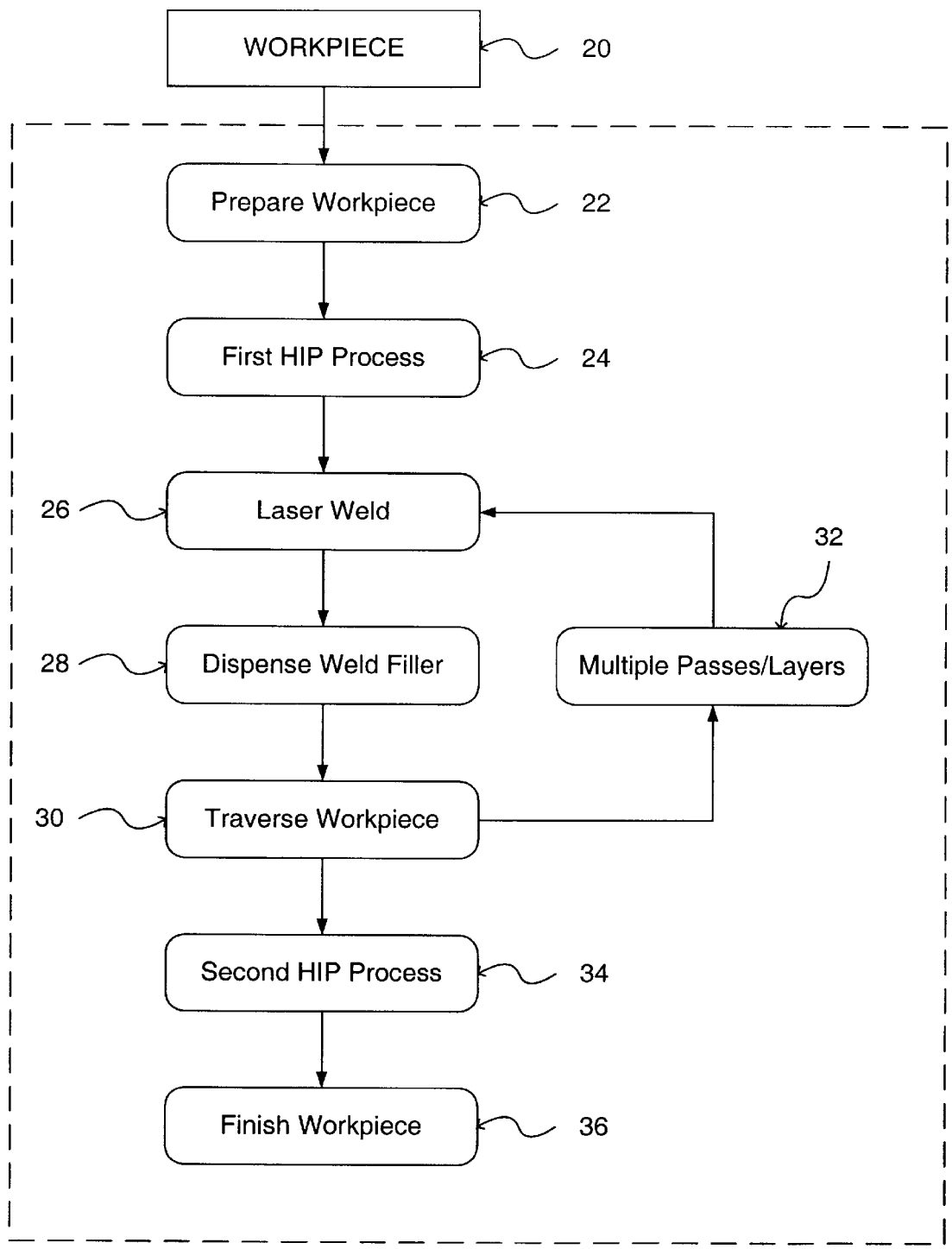
FIG. 1 is a flow chart of an embodiment of the method of the invention.
Figure 2:
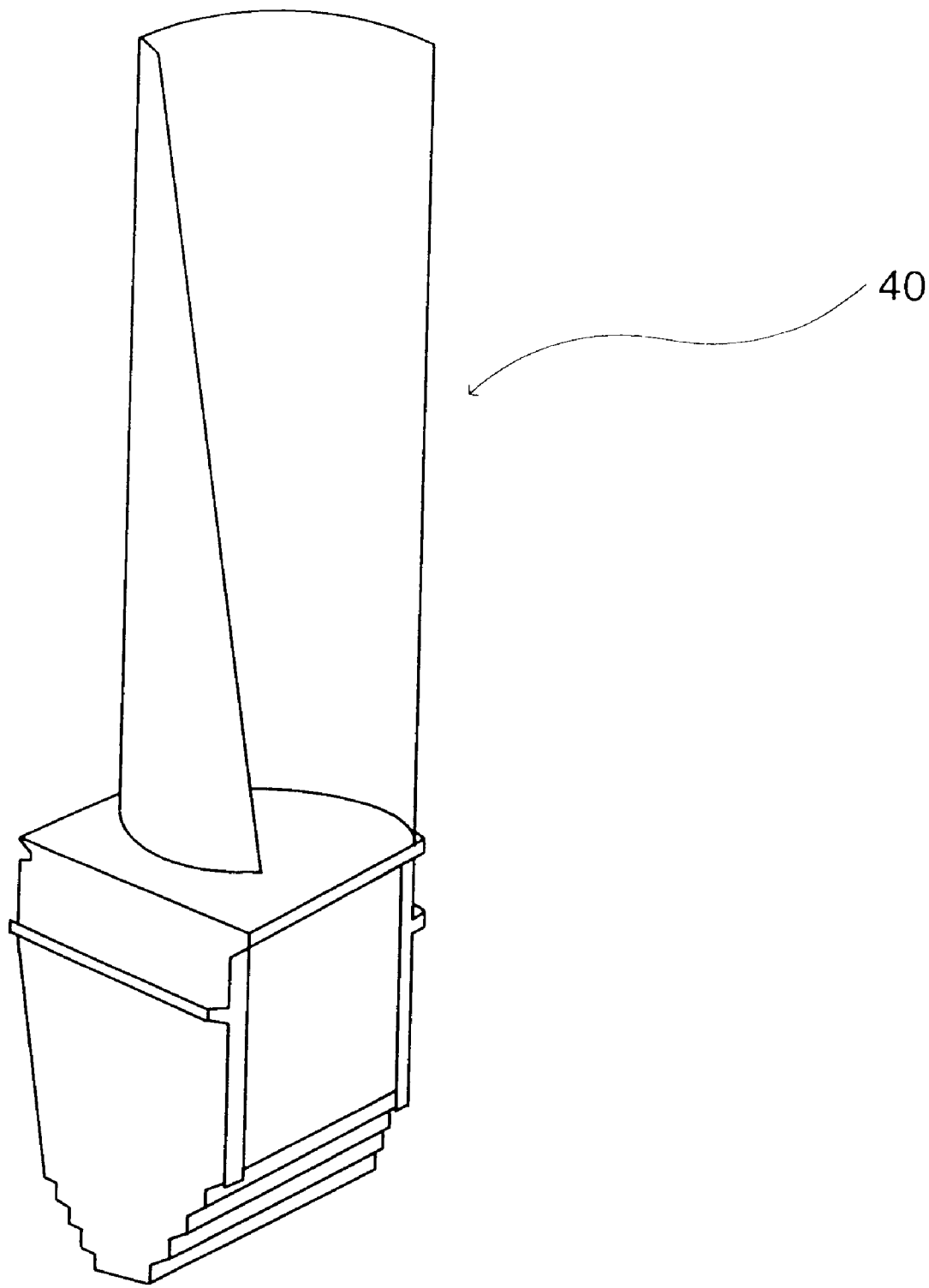
FIG. 2 is a perspective view of a turbine blade processed in accordance with an embodiment of the invention.

FIG. 1 illustrates processing steps in accordance with an embodiment of the invention. A workpiece 20, such as the turbine blade 40 of FIG. 2, which has been removed from service, is initially prepared for its repair (step 22). This preparation step may include the stripping of any protective coatings from the blade 40, and is commonly accomplished with chemical stripping solutions. The preparation step further includes preparing the specific areas of the blade 40 which are to be repaired, by conventional methods, such as, machining and grinding.

The blade 40 or workpiece 20 is then pre-conditioned for welding by a first hot isostatic process (HIP) 24. Hot isostatic processing can be described as an idealized hot pressing or forging operation, or as a high-pressure heat treatment. The basic process uses a combination of elevated temperature and isostatic gas pressure (usually inert) applied to a body. Processing is usually carried out in pressure vessels containing internal furnaces at temperatures in the range required for solution annealing. Solution annealing is where a metal and other included materials are treated to render them less brittle and more workable. The metal and other included materials are heated to a common phase and then cooled very slowly and uniformly with time and temperature set according to the properties desired. Annealing increases ductility and relieves internal strains that lead to failures in service. These annealing temperatures, coupled with the high pressures generated from the HIP process 24, tend to close voids that might have existed in the original casting as well as those that are induced by creep deformation during service exposure. Closing these voids aids in crack prevention during subsequent welding since it lowers the number of potential crack initiation sites. Heating to temperatures in the solution annealing range during the HIP cycle also increases the ductility of the alloy, thereby increasing its ability to accommodate welding strains.

Figure 4:
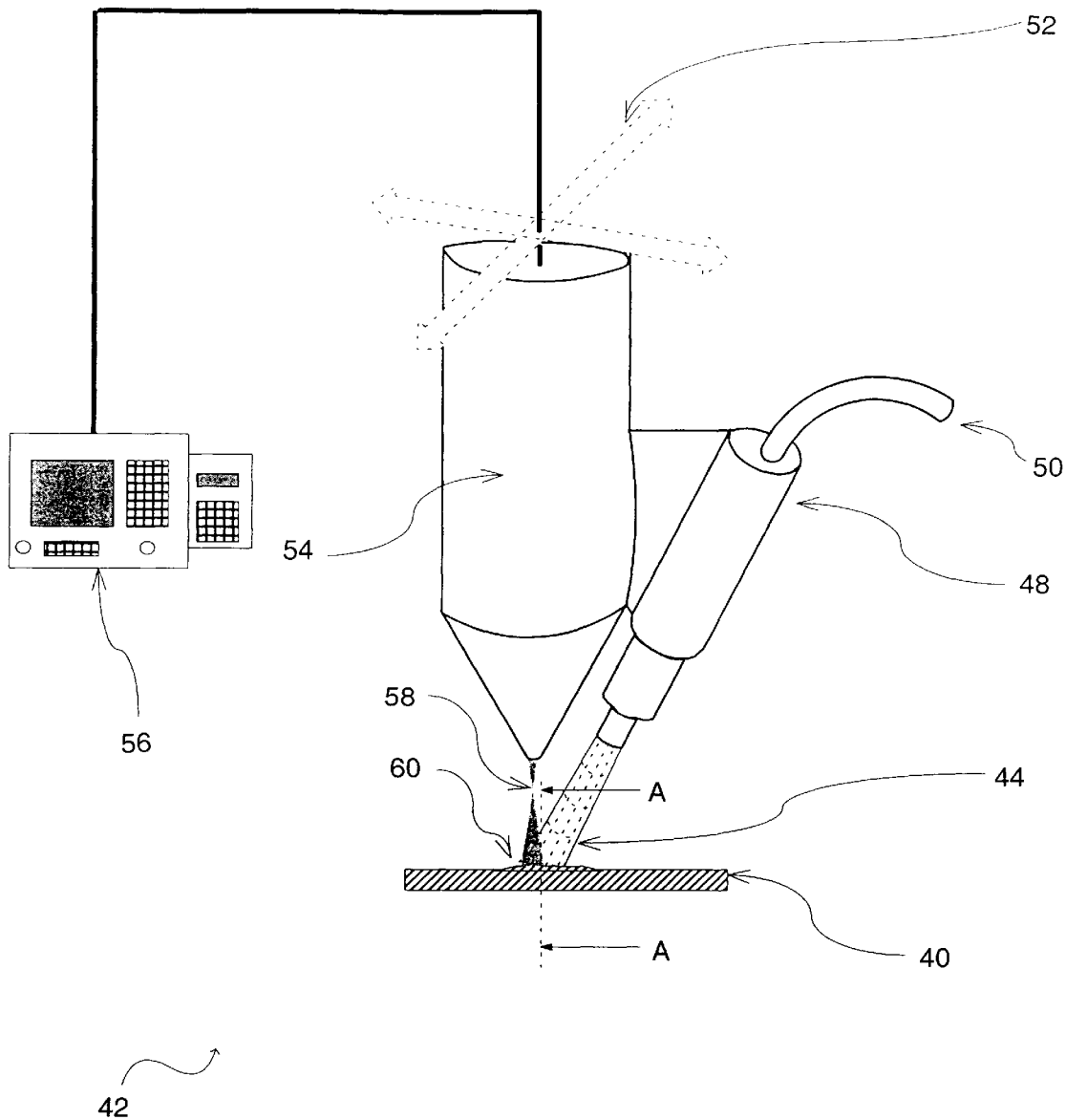
FIG. 4 is a perspective view of a laser welding head and weld filler feeder, utilized in accordance with an embodiment of the invention.

A laser welding operation (step 26) is then performed. The laser welding step 26 is accomplished by a laser welding apparatus 42 as shown in FIG. 4. The laser welding apparatus 42 includes a laser beam 58 which is formed at a lower remote end of a weld head 54. The weld head 54 is capable of moving along a plurality of axes by integrating a positioner 52 onto the upper portion of a weld head 54. This motion is controlled by a position controller 56, which may be a computer numerically controlled positioning mechanism (CNC). A feed pipe 50 introduces precipitation strengthened superalloy weld fillers 44 to a laser weld application area 60, via a powder feed system 48. The weld filler 44 is typically in a powder form and is employed to replace the blade alloy in damaged areas. The laser beam 58, together with the weld filler 44, is directed at the weld application area 60 on the area of the blade 40 being repaired.

The laser welding process can be used to repair equaixed IN-738 turbine blades and in such a case the weld fillers generally employed are of the IN-939 type or deriviatives thereof. The laser welding apparatus 42 may utilize a Nd:YAG (Yttrium Aluminum Garnet—Doped with Nd) laser or a carbon dioxide laser, but is not limited to either.

Returning to FIG. 1, the laser welding step 26 is followed by a weld filler dispensing step 28. The welding apparatus 42 is moved over the workpiece 20 during a traversing step 30 by the positioner 52. The laser apparatus 42 passes over the workpiece 20 multiple times, during a multiple pass step 32, until the workpiece 20 has been repaired.

Figure 3:
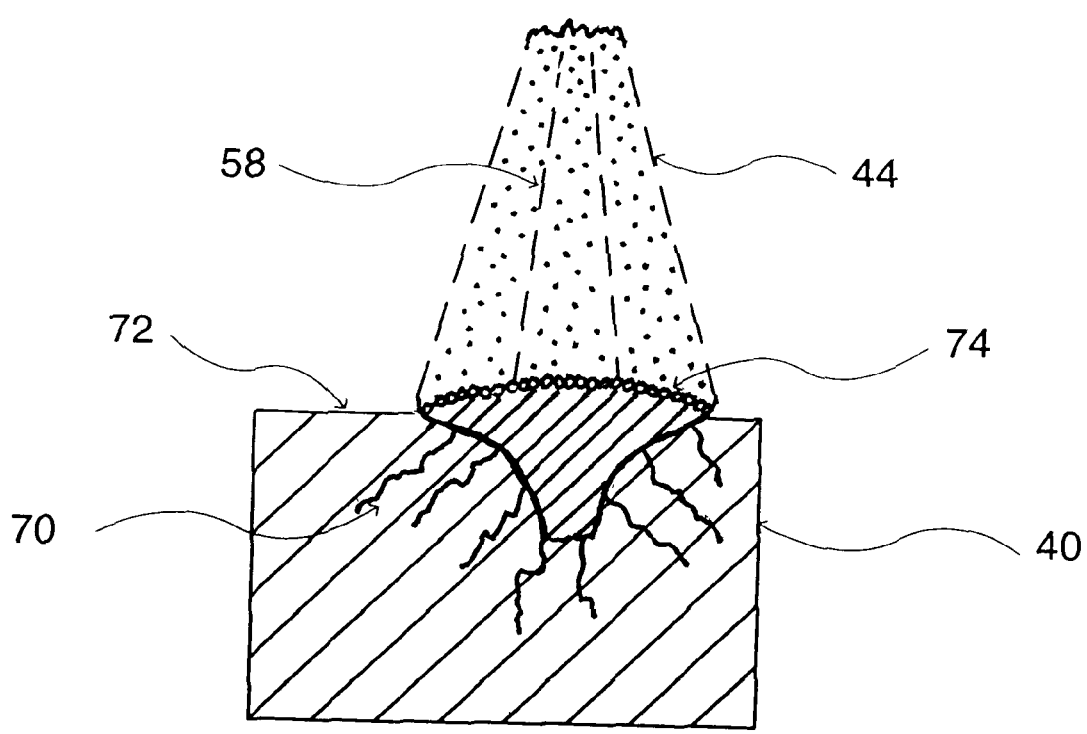
FIG. 3 is a close-up cross sectional view taken along the line A—A of FIG. 4.

FIG. 3 illustrates a close-up of the cross section taken along line A—A of FIG. 4. Due to the high strength of the blade material, very small cracks (commonly referred to as micro-cracking or fissures) 70 tend to form directly under the applied weld bead 74. These cracks do not intersect the surface 72 of the blade 40 and thus are capable of being sealed by a second HIP process. This second HIP step is depicted by numeral 34 in FIG. 1. The second HIP step 34 is performed at conditions similar to the first conditioning HIP step 24. The second HIP step 34 may include an initial operation to seal any micro-cracking. The micro-cracking sealing operation may be performed using a solid-solution strengthened alloy, such as IN625 over the IN-939 alloy. Typically, micro-cracking does not intersect the surface on small weld buildups; however, in large weld repairs/buildups, it may. A weld buildup of IN625 seals the surface such that it can undergo the second HIP process and fuse any microcracks that are present.

The last step shown in FIG. 1 is a finishing step 36. The finishing step typically includes grinding, machining, and re-coating operations. The shaping process may be performed with commercial computer numerically controlled (CNC) equipment that can accommodate the complex geometry of the blade 40. The finishing step 36 also includes age heat treating. The workpiece 20 may then be re-introduced into service.

Industry wide, the laser welding process has seen only limited use in the repair of IN-738 superalloy turbine blades. When employed, laser welding has been restricted to regions of very low stress using solid solution strengthened filler alloys, mainly IN-625, which provide mechanical properties significantly inferior to those of the base IN-738 material. Structural weld repairs that extend into the more highly stressed regions of the blade cannot be performed currently. The use of laser welding combined with precipitation-strengthened filler alloys and hot isostatic processing provides the ability to perform welds that have higher strength. The present invention therefore allows repairs to be made in the higher stressed regions of the blade which, in many cases, will permit repair of blades that would have previously been scrapped.

Those skilled in the art will appreciate that the techniques of the invention can be used to effectuate a variety of repairs. For example, another form of repairs is that performed following damage to the blade by excessive erosion, hot-corrosion, or overstripping. In this form of damage, the blade has become too thin to be repaired by conventional welding methodologies. With laser beam welding, repairs can be performed on much thinner members; thus, the surface of the blade that has suffered from one of these forms of damage can be restored using a weld overlay technique.

While the foregoing description and drawings represent the preferred embodiments of the present invention, it will be understood that various additions, modifications and substitutions may be made therein without departing from the spirit and scope of the present invention as defined in the accompanying claims. In particular, it will b clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A method of repairing a metallic member, including the steps of:
   subjecting said metallic member to a first hot isostatic processing operation;
   laser welding said metallic member; and
   exposing said metallic member to a second hot isostatic processing operation.

2. The method according to claim 1, wherein said laser welding step includes the step of Nd:YAG laser welding said metallic member.

3. The method according to claim 1, wherein said laser welding step includes the step of Carbon Dioxide laser welding said metallic member.

4. The method according to claim 1, wherein said welding step further includes the step of delivering a weld filler to said metallic member.

5. The method according to claim 4, wherein said welding step further includes the step of traversing said metallic member at least once.

6. The method according to claim 5, wherein said welding step further includes the step of passing over said metallic member several times, thereby repeating said traversing step.

7. The method according to claim 6, wherein said method further includes an initial step of preparing said metallic member for repair.

8. The method according to claim 7, wherein said preparing step includes a combination of chemical stripping, machining and grinding said metallic member.

9. The method according to claim 8 wherein said method further includes a final step of finishing said metallic member.

10. The method according to claim 9, wherein said finishing step further includes any combination of grinding, machining, re-coating and age heat treating of said member.

11. The method according to claim 9, wherein said weld filler comprises a precipitation strengthened super-alloy.

12. The method according to claim 11, wherein said welding step replaces material absent in an area being repaired.

13. The method according to claim 11, wherein said welding step includes the step of introducing said super-alloy weld filler in a powder form.

14. The method according to claim 11, wherein said precipitation strengthened super-alloy comprises IN-939 or a derivative thereof.

15. The method according to claim 14, wherein said welding step includes the step of welding a super-alloy metallic member.

16. The method according to claim 15, wherein said welding step includes the step of welding a turbine-blade.

17. The method according to claim 1, wherein said subjecting and exposing steps are performed at temperatures required for solution annealing.

18. The method of claim 1 wherein said exposing step includes the step of sealing micro-cracks prior to said second hot isostatic processing operation.

* * * * *